May 8, 1951     E. B. HICKEY     2,552,095
EYELASH CURLER
Filed July 19, 1947
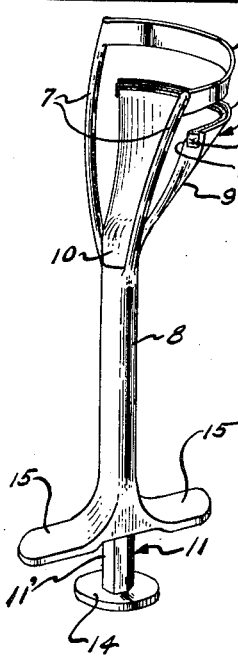
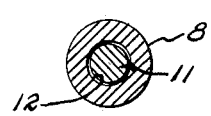
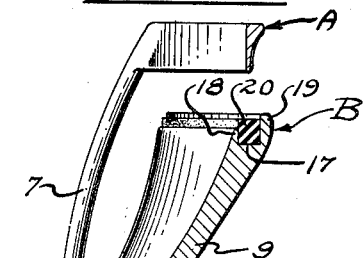
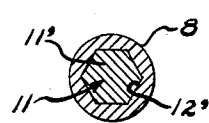
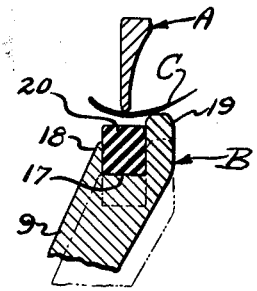
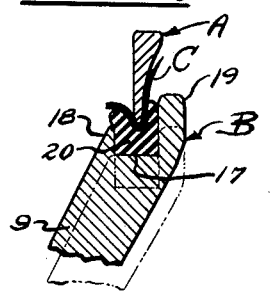
Inventor
Eve Byron Hickey
By R. S. Berry
Attorney Patented May 8, 1951

2,552,095

UNITED STATES PATENT OFFICE 2,552,095

EYELASH CURLER

Eve Byron Hickey, Mill Valley, Calif.

Application July 19, 1947, Serial No. 762,132

1 Claim. (Cl. 132—32)

This invention relates to improvements in eyelash curlers of the type forming the subject matter of Letters Patent No. 2,411,519 issued to me under date of November 26, 1946.

One of the objects of this invention is the provision of a new construction and arrangement of the jaws of such a curler whereby a more pronounced and effective crimping and curling action is assured.

Another object is to provide a curler of the character described in which the body thereof and the operating means for the two jaws are constructed and arranged in a novel manner which makes for a quicker and easier assembling of the curler as well as a more reliable action of the curling jaws and reduces the weight and bulk, also the cost of manufacture thereof.

A further object is to provide a jaw construction and arrangement in which a soft rubber insert is mounted in one of the jaws with its upper surface below the plane of a lip on the outer side of said one jaw whereby in positioning the jaws for use, the eyelashes will initially rest upon the lip and become spread apart uniformly preliminary to being crimped between the other jaw and the rubber insert as the jaws are forced together, the said lip controlling the expansion and distortion of the rubber insert in such manner that a more pronounced crimping action and resultant curling effect are produced than heretofore possible with eyelash curlers without severing or pulling out of the eyelashes.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of an eyelash curler embodying the present invention, Fig. 2 is an enlarged longitudinal sectional view of the curler, Figs. 3 and 4 are cross sectional views taken respectively on the lines 3—3 and 4—4 of Fig. 2, Fig. 5 is an enlarged semi-schematic sectional view showing how the jaws are initially positioned to receive the eyelashes therebetween, Fig. 6 is a view similar to Fig. 5 showing how the crimping and curling action is effected in accordance with this invention, and Fig. 7 is a fragmentary vertical sectional view of a modified form of the invention.

Referring to the drawing more specifically, A and B designate upper and lower curling or crimping jaws between which the eyelashes are crimped, said jaws being correspondingly curved so as to follow the curvature of the row of eyelashes of the eye and being of sufficient length to assure that all of the eyelashes of the eye will be simultaneously and uniformly crimped.

As here shown the upper jaw A is supported by means of a pair of like curved arms 7 welded to the ends of the jaw or otherwise joined thereto and extending downwardly and convergently and joined to opposite sides of the upper end of a cylindrical body member 8, said arms being welded or otherwise fixed to said body member. The curvature of the arms 7 is such that the upper jaw is disposed in laterally offset relation to the longitudinal axis of the body member whereby it may be readily and easily positioned adjacent the eyelids in the operation of curling the eyelashes.

The lower jaw B is formed on the upper edge of an upwardly flared plate-like shank 9 which is curved in cross section and slants outwardly and upwardly from the axis of the body member. This jaw is substantially concentric with and disposed opposite and beneath the upper jaw. The lower portion of the shank 9 is formed as a cylindrical socket 10 substantially equal in diameter to that of the body member 8.

An operating plunger 11 is slidable in a bore 12 extending through the body member 8 and has the socket 10 of the shank 9 of the lower jaw B press-fitted on one end thereof so that the jaw is movable with the plunger. A coiled spring 13 is mounted in a hexagonal portion 12' of the bore as shown in Fig. 2. The plunger has a hexagonal portion 11' which fits slidably in the hexagonal portion 12' of the bore and is thus prevented from turning about its axis whereby the jaw B is held in proper position. The spring 13 is arranged to normally hold the plunger 11 retracted so that the lower jaw B is disposed in spaced relation to the upper jaw. A thumb piece 14 on the plunger 11 together with laterally extending finger grips 15 on the body member 8 make it possible for the operator to easily hold the curler in the desired position and manipulate the plunger with the thumb so as to bring the jaws together for a crimping action, the spring retracting the plunger and separating the jaws when thumb pressure is removed from the thumb piece.

It should be noted that the construction of the curler is such as to facilitate an easy assembly thereof, the plunger with the spring thereon being inserted into the bore 12 and the jaw B being then attached by press-fitting the socket 10 on the plunger thereby completing the main assembling operation.

In accordance with this invention the lower jaw B is of special construction and arrangement being provided in its upper surface with a groove or channel 17. The inner sidewall 18 of the groove is of less height than the outer sidewall which latter serves as a curved lip 19 extending the full length of the jaw. A soft rubber insert strip 20 of substantially square cross section is fitted tightly in the groove 17 so that when bottomed its upper flat surface is disposed somewhat above the plane of the inner sidewall 18 and below the plane of the outer edge of the lip 19. This arrangement disposes the rubber insert 20 so that the lower edge of the upper jaw A will contact the insert along the approximate longitudinal medial line thereof and depress the rubber during the crimping and curling of the eyelashes.

When the jaws A and B are positioned as shown in Fig. 5 with the eyelashes C therebetween, the lashes will initially rest on the lip 19 above the plane of the rubber insert 20 and become uniformly separated preliminary to being crimped between the jaws. With the jaws positioned to receive the eyelashes therebetween the operator pushes with the thumb against the thumb piece 14 while gripping the finger grips 15 thereby forcing the jaws together. The upper jaw will depress the eyelashes into the rubber insert which is controlled as to its distortion by the sidewalls of the groove in which it is held. As shown in Fig. 6 that part of the rubber insert between the inner wall 18 of the groove and the lower edge of the upper jaw A will be distorted or forced rearwardly and upwardly so as to extend rearwardly of and overhang the upper edge of the wall 18 being extended somewhat divergently from the more or less vertical and flat rear face of said upper jaw. In this connection it should be noted that the upper jaw tapers to a relatively thin lower edge which is somewhat rounded to avoid severing the eyelashes. The outer face of this jaw is somewhat concaved and its lower margin is arranged to engage the upper face of the rubber insert in horizontally spaced relation to the inner margin of the lip 19 and in inwardly spaced relation to the outer margin of the insert. As the thin lower edge of the upper jaw is forced into the rubber insert with the eyelashes thereunder, that portion of the rubber insert between said lower edge of the upper jaw and the lip 19 is held by the lip against being forced outwardly and is therefore displaced upwardly and rearwardly against the concave outer face of the upper jaw as shown in Fig. 6. This action causes the eyelashes to be pressed sharply upwardly by the portion of the rubber insert which is displaced as aforesaid upwardly and rearwardly against the outer face of the upper jaw, thereby crimping the eyelashes under a resilient action of the displaced rubber in such manner as to produce a uniform and lasting curling without pulling out or severing the eyelashes. The eyelashes will be pressed against and follow the curvature of the concaved outer face of the upper jaw by the controlled distorted portion of the rubber insert. The portions of the eyelashes lying over the distorted rubber portion rearwardly of the upper jaw are only gradually bent or curved to the point where the sharp crimping takes place at the point of deepest depression of the upper jaw into the rubber insert. From this point on the eyelashes are most forcibly bent and sharply urged upwardly against the curved outer face of the upper jaw under a yielding resilient force which produce, a most effective curling thereof.

As shown in Fig. 7 I may employ a modified form of actuating means for moving the jaws together, said jaws being of the same construction as shown in Figs. 1 to 6 inclusive. In this modified form a cylindrical body member 22 has the upper jaw (not shown) fixed thereto in the same manner as shown in Fig. 1 and the plunger 23 has the lower jaw (also not shown) fixed thereto in the same manner as shown in Fig. 2. The lower end of the plunger 23 is rotatably fixed as at 24 to a cylindrical operating cap 25 which is internally screw threaded and threadedly engaged with a screw threaded enlargement or flange 26 on the body portion. With this arrangement, on the turning of the cap 25 on its axis and relative to the plunger 23, the cap and plunger are moved axially, whereby the plunger may be reciprocated to bring the lower jaw into and out of clamping relation to the upper jaw in the same manner as is the case with the curler shown in Figs. 1 to 6 inclusive.

While I have shown and described a specific embodiment of my invention, I do not limit myself to the exact details of construction set forth, and the invention embraces such changes, modifications and equivalents of the parts and their formation and arrangement as come within the purview of the appended claim.

I claim:

In an eyelash curler embodying a longitudinally curved fixed jaw, a correspondingly curved movable jaw having a longitudinally extending groove in its upper edge disposed to register with the lower margin of the fixed jaw, said jaws being adapted to receive eyelashes therebetween, means for advancing and retracting said movable jaw relative to said fixed jaw, and a soft elastic rubber insert mounted in said groove so that it will be engaged and depressed by the lower margin of said fixed jaw on bringing said jaws together with the eyelashes therebetween; a lip on said movable jaw extending along the inner margin of said groove providing a longitudinal eyelash contacting upper edge extending for substantially the full length of the movable jaw above and at right angles to the plane of the upper surface of said rubber insert, said fixed jaw being tapered to a relatively thin lower edge for contacting said rubber insert and having a concaved outer face having a lower margin which is arranged to oppose said lip and to engage said rubber insert in horizontally spaced relation to said lip and in inwardly spaced relation to the outer margin of said insert when said jaws are brought together, the upper surface of said rubber strip being disposed below the plane of said lip and above the plane of the upper edge of the inner margin of said groove.

EVE BYRON HICKEY.

REFERENCES CITED

The following references are of record in the file of this patent:

UNITED STATES PATENTS

| Number | Name | Date |
| --- | --- | --- |
| 1,527,964 | Patino | Feb. 24, 1925 |
| 2,133,042 | Risberg | Oct. 11, 1938 |
| 2,214,318 | Bernstein | Sept. 10, 1940 |
| 2,314,375 | Tuttle | Mar. 23, 1943 |
| 2,411,519 | Byron | Nov. 26, 1946 |